July 31, 1934.  C. R. SCHENCK  1,968,621
OIL COOLER
Filed Nov. 8, 1932   2 Sheets-Sheet 2

INVENTOR,
Cecil R. Schenck.
BY David E. Lain,
ATTORNEY.

Patented July 31, 1934

1,968,621

UNITED STATES PATENT OFFICE 1,968,621

OIL COOLER

Cecil R. Schenck, Bellingham, Wash., assignor of one-half to Andrew J. Riffe, Bellingham, Wash.

Application November 8, 1932, Serial No. 641,804

3 Claims. (Cl. 257—245)

My invention relates to improvements in oil coolers in which cold water is used to reduce the temperature of the oil flowing therethrough, and has for an object to provide an oil cooler consisting of an assembly of similar elements clamped together in numbers having sufficient cooling capacity for the particular requirements of the service to be rendered thereby.

Another object of my improvement is to shape the said elements suitably for casting in metals having high heat-conductivity characteristics and for finishing by a minimum amount of work with ordinary machine tools.

Other objects of my improvement will appear as the description proceeds.

Figure 1:
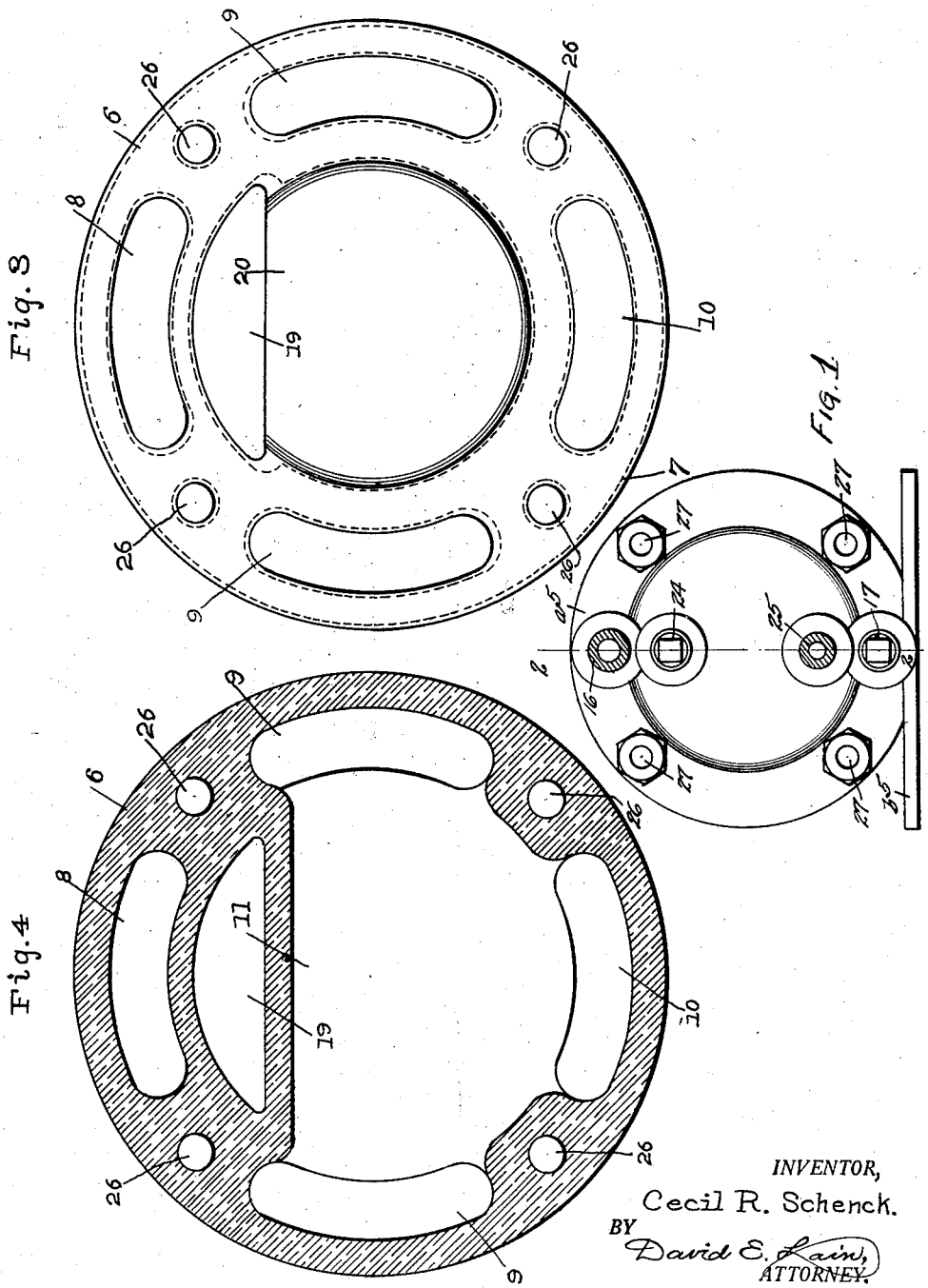
Figure 2:
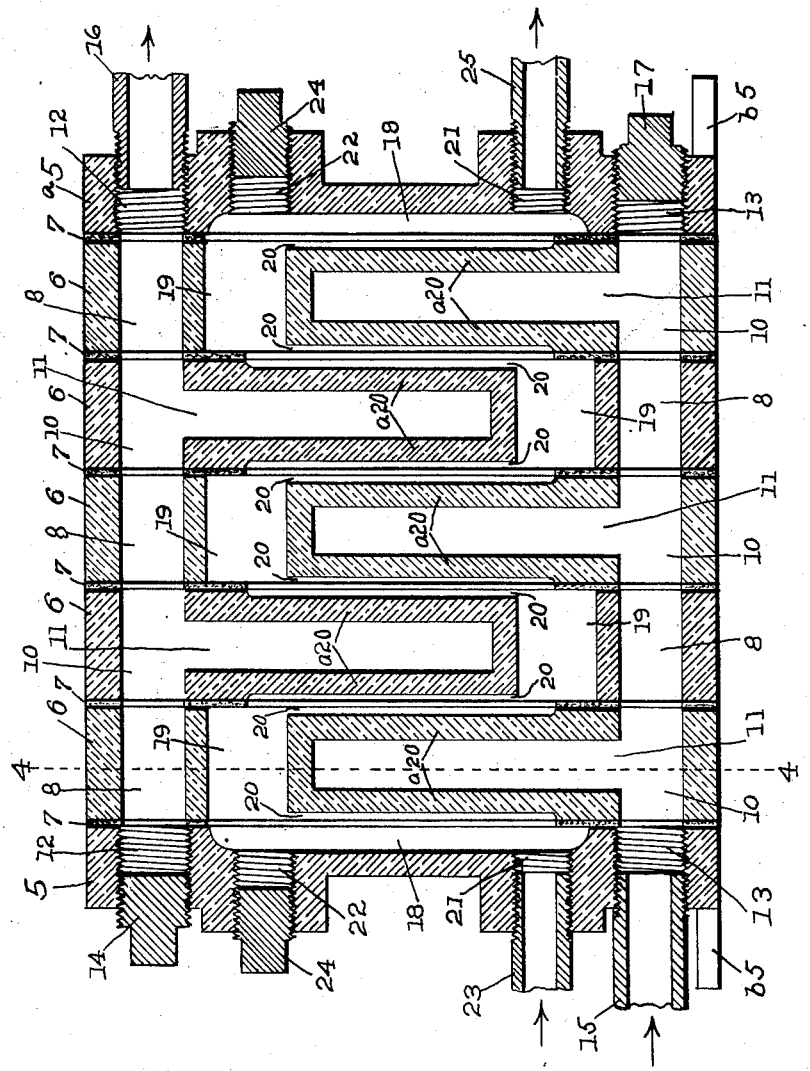

I attain these and other objects of my improvement with the device illustrated in the accompanying two sheets of drawings in which Figure 1 is an elevation view of the discharge end of my device, Fig. 2 is a longitudinal vertical section of Fig. 1 on the line 2—2, Fig. 3 is an end view of one of the similar elements, and Fig. 4 is a transverse section of Fig. 3 on the line 4—4 of Fig. 2.

Similar characters refer to similar parts throughout.

With more particular reference to the designated parts: The device consists of an assembly of similar elements clamped together with through bolts between similar end pieces with intervening gaskets.

The end pieces 5 and $a5$ are similar, the former being at the inflow end while the latter is at the discharge end of the device. The illustrated assembly has five members 6 with the gaskets 7 therebetween and also between the end members and the end plates 5, $a5$. One of the gaskets 7 is shown in place in dotted outline on the end of one of the elements shown in Fig. 3.

The elements 6 are preferably circular and cylindrical. Each element has the two longitudinally through holes 8 and 10 on opposite ends of a vertical diameter equidistant from the center. There also are two other through holes 9—9 equidistant from the center in the element on the opposite ends of a horizontal diameter. The hole 8 does not communicate with any other opening or recess in the element. The holes 9, 9 and 10 communicate through the central chamber 11.

There are also four through longitudinal bolt holes 26 in each of the members 6 on opposite ends of diagonal diameters equidistant from the center of the member.

The two end discs 5 and $a5$ are exactly similar, each having the foot $b5$, the circular recess 18 in one side, the tapped through holes 12, 13, 21 and 22 and four bolt holes aligned with the bolt holes 26 when the device is assembled. The tapped holes 12 and 13 are aligned with the member openings 8 and 10 when the device is assembled and the tapped holes 21 and 22 enter the recess 18.

When assembling the device, as clearly illustrated in Fig. 2, the desired number of the elements 6 are placed end to end with the gaskets 7 intervening, and with the holes 8 and 10 alternately registering which will cause the holes 9, 9 to register throughout the entire assembly. The end pieces 5 and $a5$ are placed at opposite ends of the assembled elements with the recesses 18, 18 thereof facing each other and gaskets 7 between the end plates and the end elements of the assembly. The bolts 27 are extended through the registering bolt holes 26 and the entire assembly is clamped together in operative relation with the nuts on the said bolts.

The water pipe 15, from a source of cold water under pressure, not shown, is engaged in the tapped hole 13 and water therefrom may enter all of the bottom registering holes 10, 8, 10, 8, 10, and from the holes 10 thereof pass upward into the central chambers 11, 11, 11. From the chambers 11 the water passes into the side holes 9 and from thence into the two central chambers 11, 11 which directly connect with the top holes 10, 10 and in this way passes into all of the top holes 8, 10, 8, 10, 8 and is discharged through the outlet pipe 16 which is engaged in the tapped hole 12 in the end disc $a5$. Thus, a current of cooling water may be caused to continuously move over all of the inner surfaces of the chamber walls $a20$ of all of the chambers 11.

The central recesses 20 in the ends of the end elements 6 join with the central recesses 18 in the end plates 5 and $a5$. The recesses 20 in adjacent ends of the elements 6 are joined in the assembly. Pipe 23 from a source of hot oil under pressure, not shown, is engaged in the tapped hole 21 in the end plate 5 and hot oil therefrom may flow into the joined recesses 18, 20 along water-cooled walls $a20$, through the first top hole 19 surrounded by water-cooled walls, into joined recesses 20, 20 between water-cooled walls $a20$, $a20$, into the first bottom hole 19 surrounded by water-cooled walls, into another chamber made by two joined recesses 20, 20 between water-cooled walls, into the second top hole 19 surrounded by water-cooled walls, into another chamber made by two joined recesses 20, 20 between water-cooled walls, into the second bottom hole 19 surrounded by water-cooled walls, into another chamber made by two joined recesses 20, 20 between water-cooled walls, into the third top hole 19 surrounded by water-cooled walls, into a chamber made by one of the said recesses 20 joined with the recess 18 in the end plate $a5$ along water-cooled walls to be discharged through the oil outlet pipe 25 engaged in the tapped hole 21 in the end plate $a5$. Preferably, the chambers made by joined recesses 20, 20 are relatively narrow but of considerable area in order that, while a considerable volume of oil may pass through the chambers 20, 20, the movement of the oil along the cooled walls $a20$ is relatively slow thus providing for the rapid cooling of the oil while passing through these chambers.

Thus it is made clear that cold water and hot oil may be simultaneously caused to flow through this device resulting in lowering the temperature of the oil by contact with a large area of water-cooled metal walls.

The device is exceedingly simple, easy to construct and maintain, capable of increasing the temperature reduction of the oil by adding elements thereto, and in practice it has been found to be relatively small in size as compared with the usual oil coolers of equal capacity.

The tapped hole 22 shown with the plug 24 therein, see Fig. 2, would be used for the oil-discharge pipe 25, if an even number rather than an odd number of the elements 6 were used in the assembly, in order to cause the oil to traverse the entire wall $a20$ adjacent the end plate $a5$. This variation is due to the alternate reversed relation of the elements 6 in the assembly thereof. The same construction is shown in the end plate 5 for, in practice, the same pattern serves for moulding both of the end plates.

Having thus disclosed my invention, what I claim as new therein and desire to secure by Letters Patent is,—

1. An oil cooler including an assembly of similar elements each element having a central walled chamber and external recesses separate from the chamber said elements being adapted for assembly end to end providing a water conduit through the said chambers and an oil conduit separate from the water conduit through the said recesses.

2. An oil cooler including an assembly of similar elements each element having a central walled chamber for water, through water holes connected with the water chamber, a separate through water hole, external oil recesses and a through oil hole connected with the recesses separate from the said water holes and chamber, being adapted for assembly end to end in alternate reversed relation, providing a conduit for water through the said water holes and chambers and a conduit for oil through the said recesses and oil holes separate from the said water conduit.

3. An oil cooler including an assembly of similar elements each of the said elements having a central walled chamber and conduits in the element connected therewith a separate conduit in each element recesses in the external surfaces of the said chamber walls and conduits in the element connected therewith said elements being adapted for end to end assembly, an end disc disposed on one end of the said assembly of elements and having separate pipe connections with a source of cold water and a source of hot oil, another end disc disposed on the other end of the said assembly of elements and having separate water and oil discharge pipes, the said water supply and discharge pipes having conduit connections through the said assembly of elements provided by the said chambers and conduit connections in said elements, the said oil supply and discharge pipes having conduit connections through the said assembly of elements provided by the said recesses and conduit connections in said elements, means to separate the said water conduit through the assembly of elements from the said oil conduit therethrough, and means to clamp the said end discs and intervening assembly of elements together in operative relation.

CECIL R. SCHENCK.